United States Patent [19]

Wright

[11] 4,325,088

[45] Apr. 13, 1982

[54] LAP AND DISSOLVE IN VIDEO CAMERAS WITH VTR

[75] Inventor: Charles E. Wright, Escondido, Calif.

[73] Assignee: Eastman Technology, Inc., Rochester, N.Y.

[21] Appl. No.: 132,967

[22] Filed: Mar. 24, 1980

[51] Int. Cl.³ ............................................. H04N 5/79
[52] U.S. Cl. ....................................... 360/14; 360/33; 360/66; 358/182
[58] Field of Search ................... 360/66, 74.4, 33, 14, 360/29; 358/127, 182

[56] References Cited

U.S. PATENT DOCUMENTS

| | | | |
|---|---|---|---|
| 3,296,367 | 1/1967 | Cassagne | 358/182 |
| 3,368,032 | 2/1968 | Gooch | 360/66 |
| 3,392,231 | 7/1968 | Schonfelder | 358/182 |
| 3,673,324 | 6/1972 | Ito | 358/182 |
| 3,721,757 | 3/1973 | Ettlinger | 360/10 |
| 3,974,522 | 8/1976 | Fukatsu | 360/14 |
| 3,975,764 | 8/1976 | Kabayashi | 360/23 |
| 3,982,274 | 9/1976 | Chai | 358/213 |
| 4,001,882 | 1/1977 | Fiori | 360/14 |
| 4,040,098 | 8/1977 | Beeson | 358/127 |

OTHER PUBLICATIONS

"Cut/Lap A New Method for Programmable Fade and Soft Edit transpositions using a single source VTR" by G. W. Bates-SMPTE Journal, 1974, vol. 88, pp. 160, 161.

Primary Examiner—Vincent P. Canney
Assistant Examiner—Alan Faber
Attorney, Agent, or Firm—Robert F. Cody

[57] ABSTRACT

A video camera is provided with means for producing lap and/or dissolve effects between successively recorded scenes. Means are provided for controlling the level of AC bias accompanying the video signals applied to a magnetic recording head. A dissolve effect is achieved by gradually decreasing the level of such bias at the end of a recorded scene. A lap effect is achieved by gradually increasing the bias level at the beginning of a new scene. A simultaneous lap and dissolve effect is achieved by performing the individual lap and dissolve effects on the same segment of tape. To do this, the tape drive is reversed at the end of each scene to position the dissolved portion of the scene upstream of the magnetic recording head. Upon recording a new scene while gradually increasing the level of AC bias at the beginning thereof, a simultaneous lap and dissolve effect is achieved automatically.

14 Claims, 4 Drawing Figures

LAP AND DISSOLVE IN VIDEO CAMERAS WITH VTR

BACKGROUND OF THE INVENTION

The present invention relates to improvements in video (i.e. television) cameras of the type which record electronic video signals on magnetic records. More particularly, this invention relates to a lap and dissolve apparatus for use in such cameras.

The invention is especially suitable for use in providing a lap and dissolve feature for electronic motion picture cameras which record television signals on magnetic records, such as magnetic tapes, discs, and the like. The invention is applicable to video recording systems generally and may be used in providing edited television programs.

Lap and dissolve effects between successive scenes recorded by video techniques have been achieved by controlling the amplitudes of separate video signals derived from separate scenes (see, for example, the disclosures of U.S. Pat. Nos. 3,296,367; 3,392,231 and 3,673,324.) According to these disclosures, the video signals of successive scenes are mixed and re-recorded. Special mixers are used to preserve synchronizing and color subcarrier components of the video signals. This technique for producing lap and dissolve effects does not operate in real time and, hence, does not enable successive scenes to dissolve and lap into each other as they are taken by the video camera operator. Further, the complexity and the associated cost of the lap and dissolve apparatus heretofore suggested makes them suitable for use in professional editing systems used in motion picture or television studios, not for use in video cameras which may be used by amateurs and home movie enthusiasts.

SUMMARY OF THE INVENTION

Briefly described, the invention provides for use in a video camera which records the pictures on a moving record member, an apparatus for producing lap and/or dissolve effects between successive recorded scenes. The apparatus of the invention comprises means for controlling the level of AC bias applied to a magnetic recording head while recording the end and beginning portions of successive scenes. At the end of a first recorded scene, the control means functions to gradually reduce the bias, thereby gradually decreasing the sensible level of each picture of the recorded scene to produce a dissolve effect. At the beginning of the succeeding scene, the bias level is gradually increased, thereby gradually increasing the sensible level of each picture of the succeeding scene. In this manner, the new scene is lapped in. Preferably, means are provided for driving the record member in a reverse direction after the first scene is recorded so that the lap and dissolve effects are produced on the same portion of the record member. Preferably, the rate of change in bias level and the direction of the record member are controlled by timing signals which are recorded as the video signals are recorded on a timing track on the magnetic record member.

Other objects, features and advantages of the invention, as well as the presently preferred embodiments thereof, will become more apparent from a reading of the following description in connection with the accompanying drawings.

DETAILED DESCRIPTION OF PREFERRED EMBODIMENTS

Figure 1:
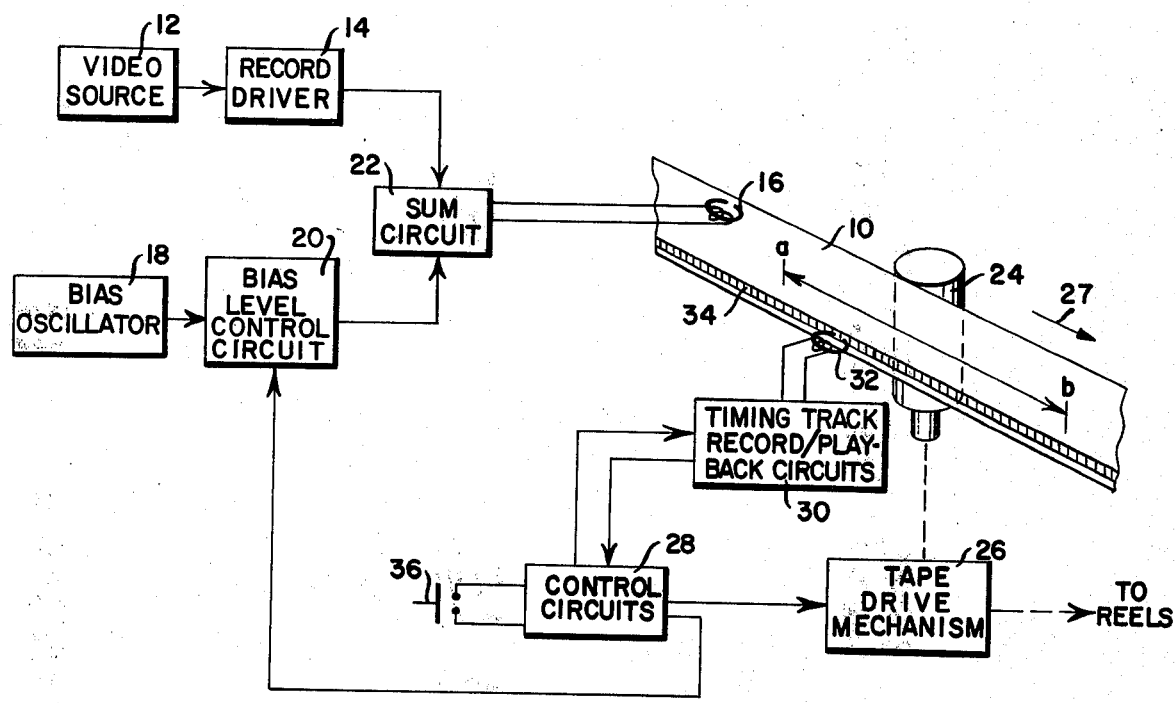
FIG. 1 is a block diagram schematically showing an apparatus in accordance with a preferred embodiment of the invention for magnetically recording television pictures from successive scenes with lap and dissolve effects.

Referring first to FIG. 1, there is schematically shown a video camera for recording television signals on a magnetic tape record member 10. The television signals in this embodiment of the invention represent successive horizontal lines of successive frames of television pictures. The frames may be successive fields which are interlaced upon display in a television monitor or receiver to provide the television picture. A conventional video source 12 provides the television (video) signals representing the frames or fields of the television pictures. Source 12 may comprise, for example, phototransducers, a vidicon, or the like. However, for convenience in size and weight of the camera system, the use of a solid state image sensor array, such as a charge coupled device (CCD) array, is preferred. A suitable CCD array is disclosed in U.S. Pat. No. 3,982,274, issued to S. Chai, the disclosure of which is incorporated herein by reference.

The video signals provided by video source 12 contain luminance information, as well as synchronizing and subcarrier components in the conventional form (e.g. NTSC signals). These signals are amplified in a record driver circuit 14 and are applied to a magnetic record head 16 which records them on the tape 10 longitudinally or with a helical scan by conventional video recording techniques. A bias oscillator 18 provides high frequency alternating current oscillations to the head through the bias level control circuit 20 and a summing circuit 22. The bias level control circuit may be a variable gain amplifier, such as a field effect transistor (FET) amplifier, which presents a variable resistance in accordance with a control voltage applied to the gate or control electrode thereof. The summing circuit may be a resistive circuit or another amplifier. The summing circuit serves to sum the amplified video signal with the bias level and to apply the resulting signal to record head 16.

The tape 10 is driven past head 16 by conventional drive means used in video recorders. Such drive means typically includes a capstan 24 mechanically coupled to a reversible (i.e. bidirectional) tape drive mechanism 26. The mechanism 26 contains a motor for driving the capstan and the reels of the recorder as well as control circuits for these motors. During the recording process, mechanism 26 drives the tape in the forward direction (as indicated by the arrow 27); however, mechanism 26 is adapted to drive the tape in the reverse direction upon receipt of control signals from control circuits 28.

Control circuits 28 are connected to timing track record/playback circuits 30 which, in turn, control the operation of a magnetic head 32. The head 32 may be two adjacent heads, one of which records timing signals on a separate track 34 when the tape is driven forwardly in the recording mode, and the other reads the timing track signals when the tape is advanced in the reverse direction. The signals which are recorded on the timing track 34 may, for example, be obtained from the video signals and may be pulsed synchronous with the horizontal sync pulses of the video signal which is recorded on the tape 10. Conventional sync separating circuits may be used to derive these synchronizing signals from the video signals. Alternatively, the timing track circuits 30 may contain their own source of marker pulses which are recorded on the tape when the video signals are being recorded thereon. It may be desirable to pre-record the timing track and provide only timing track playback circuits which respond to the recorded timing or marker signals on the timing track 34. In the event that the tape has sprocket holes, these holes may be sensed, either directly or by means of a sensor coupled to the sprocket engaged with the holes for obtaining the marker or timing signals.

Figure 2:
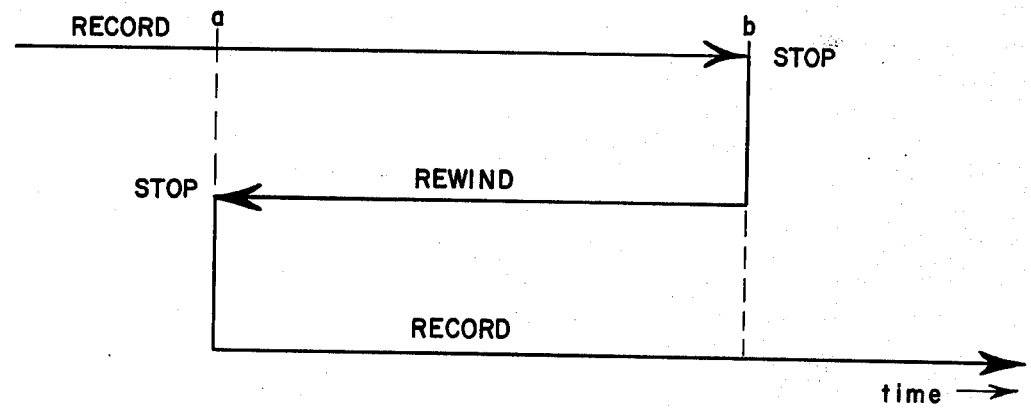
FIG. 2 is a timing diagram illustrating the motion of the magnetic tape record member while the television pictures are recorded to obtain the lap and dissolve effects.

The control circuits 28 are operated by a record switch 36, illustrated as a push button switch. This record switch is actuated to close a circuit in the control circuits 28 when the pictures are being taken and when recording thereof is desired. At the end of each scene of pictures the record switch is released. Timing circuits in the control circuits which are controlled by the timing or marker signals of the timing track 34 respond to the release of the record switch 36 at the end of each scene and by-pass the record switch 36 so that video signals of a predetermined number of successive pictures (i.e. fields or frames) continue to be recorded while the tape is driven in the forward direction for a predetermined distance, indicated in FIGS. 1 and 2, as from a to b. Upon reaching the end of this predetermined distance, or at point b, the tape stops. The control circuits 28 then provide control signals to the reversible tape drive mechanism 26 to rewind or drive the tape in the reverse direction for at least the predetermined distance. The tape is then driven from point b back to point a where it stops. The tape may be driven somewhat further in the reverse direction past point a (viz., pre-rolled) in order to provide some timing pulses which lock in the control circuits and the tape drive mechanism 26 before the succeeding scene is recorded by again engaging the record switch. The tape is then driven in the forward direction and passes over the predetermined distance from a to b, and thereafter continues recording pictures of the succeeding scene.

Figure 3:
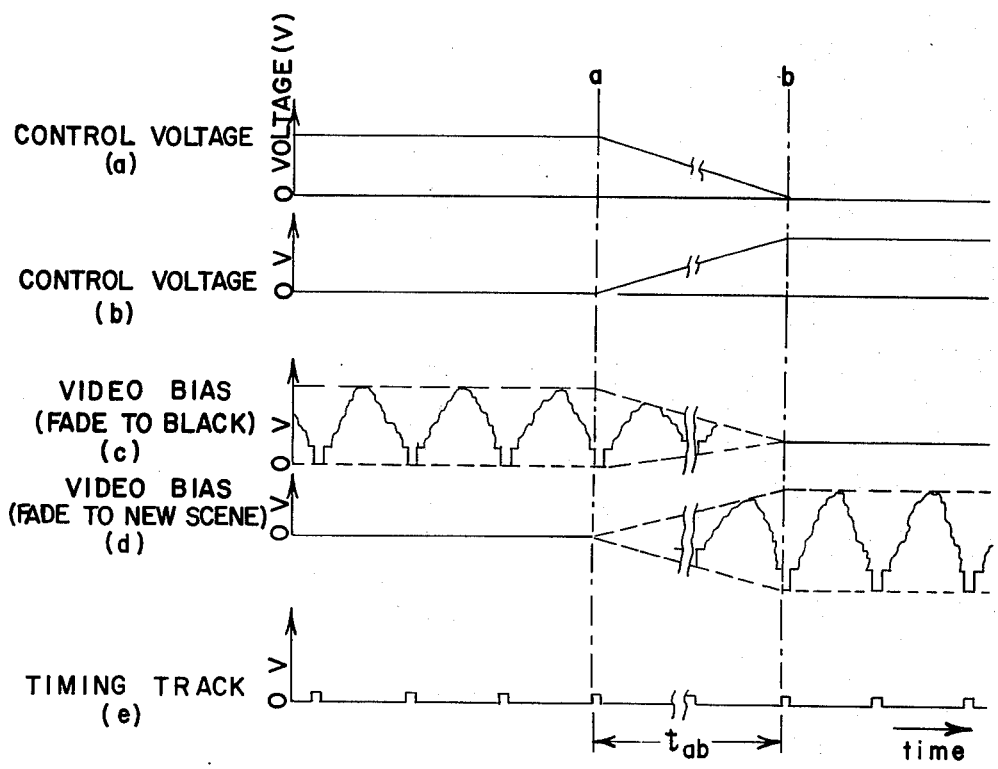
FIG. 3 illustrates various waveforms of the signals processed by the FIG. 1 apparatus.

Control circuits 28 contain control voltage generators which are timed by the timing track signals so as to be generated while the tape is moving the predetermined distance (a to b) in the forward direction at the end of the preceeding scene and over the same distance (a to b) after the rewind operation at the beginning of the succeeding scene. During the travel time of the tape over these predetermined distances, control voltages in the form of ramps (shown in waveforms (a) and (b) of the FIG. 3) are generated. These control voltages vary in amplitude between zero voltage and a high voltage which is the same in the case of both control voltage (a) and control voltage (b). The control voltages operate the bias level control circuit 20 and vary the amplitude of the AC bias oscillations. The amplitude of these oscillations decreases in level at the end of a recorded scene and increases in level at the beginning of the next succeeding scene, while the tape travels over the overlapping distances a to b.

The sensible level of the signals recorded on the tape changes correspondingly with the change in the bias oscillation level. This is because the remanent signal on the tape requires bias oscillation for the recording thereof and the recorded flux density of the magnetically recorded signal is directly related to the bias oscillation level. The rate of increase and decrease of the sensible level, and of the bias oscillation level is the same and is linear in the illustrated embodiment of the invention. Other rates may be selected which need not be linear depending upon the visual effects desired.

The magnetically recorded signal which corresponds to the sensible level of the recorded pictures are shown in waveforms (c) and (d). As each scene ends, the video and bias levels are gradually changed to cause the luminance level to increase from zero to the level corresponding to the luminance of the new scene. Waveforms (c) and (d) show successive horizontal lines of the video signals. They are broken to illustrate that the period during which the tape travels between a and b ($t_{ab}$) is of a duration which may occupy several fields or frames. The lap and dissolve interval, $t_{ab}$, may be one second, which is the time for the thirty frames or sixty fields. During the lap and dissolve interval, the timing track is read and a number of timing signals corresponding to the number of frames or fields in the lap and dissolve interval, $t_{ab}$, are applied to the control circuit 28. The control circuit may contain counters and other conventional components which provide the tape drive control outputs and the control voltage ramps during the interval $t_{ab}$ that the tape travels the predetermined distance for the recording of the 60 fields or 30 frames. Of course, 60 fields and 30 frames or one second of recording time is entirely exemplary of a suitable lap and dissolve interval. Other intervals for lap and dissolve and corresponding predetermined distances on the tape may be selected. The design of the control circuits 28 from conventional components such as counters provide the control voltages and tape drive control signals may be implemented with known design techniques. Accordingly, the circuits 28 are not described in detail herein.

The control circuits 28 may also be selectively programmed to not rewind the tape at the end of a scene. The bias level then gradually decreases over the distance a to b for the time $t_{ab}$ at the end of the preceding scene. For a distance equal to the distance from a to b and a time equal to $t_{ab}$ at the beginning of the succeeding scene, the bias is gradually increased. Upon playback the sensible level of the pictures fades out at the end of the old scene to black. The pictures dissolve and fade in from black to the new scene. Different manners in which the previous scene dissolves and the new scene laps in may be programmed be programming the direction and distance of tape travel and the rate of variation of bias level at the end and beginning of successive scenes, for example, only a dissolve, only a lap, dissolve and lap-in in tandem (not overlapping), and simultaneous lap and dissolve. The latter is in accordance with the preferred embodiment of the invention.

The lap and dissolve feature afforded by the invention is carried out in real time and without the need for separate, simultaneous signal sources as in existing lap and dissolve editing systems.

Figure 4:
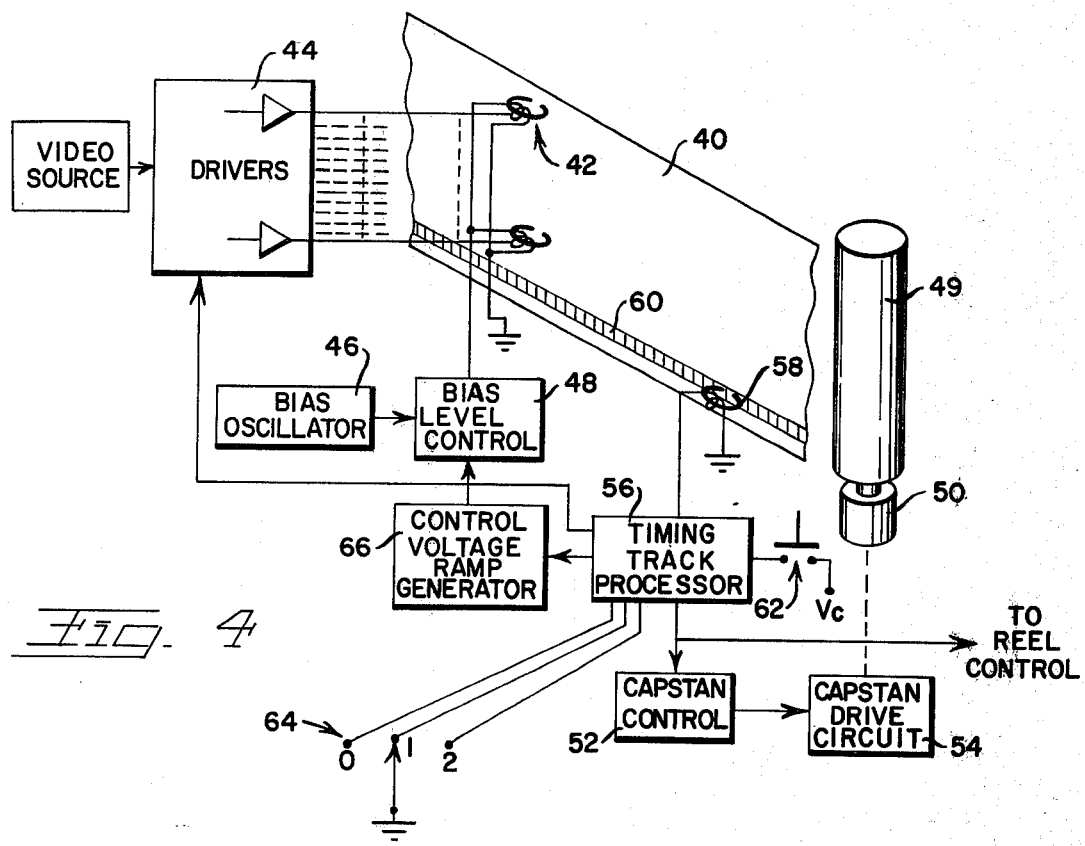
FIG. 4 is a block diagram of another preferred embodiment of the invention.

Referring to FIG. 4 there is shown a video recording system where successive pictures are recorded on a magnetic tape record 40 by means of a multitrack record head 42. This head comprises a large number of tracks (e.g. 280). The horizontal lines of each frame are recorded simultaneously on these tracks. The video signal for the head may be obtained from a video source, such as a solid state image sensor array. Reference may be had to the disclosure of U.S. Pat. No. 3,975,764 for further information concerning multitrack video recording. This video source 44 contains driver amplifiers for each of the heads 42. The video signals are analyzed and are recorded with alternating current, high frequency bias. A bias oscillator 46 connected to the heads in parallel through a bias level control circuit 48 provides the bias. The bias oscillations and the video signal are effectively summed in the heads 42.

The tape is driven by means such as a capstan 49 and reversible capstan motor 50, and by reels (not shown), as are conventional in video recording systems. A capstan control circuit and a capstan drive amplifier circuit 52 and 54, respectively, are used to control the capstan and motor 50. Similar circuits are used for reel control. The control voltages for the tape drive are obtained from a timing track processor 56 which is connected to a timing track read/write head 58. This head may be a pair of heads, one of which reads and the other of which writes the timing signals on a timing track 60 on the tape 40. The timing track processor is activated by a record control switch 62 through which power is applied from voltage source $V_c$. Another switch 64 is used to select the lap and dissolve interval. The settings of the switch 64 provide for no lap and dissolve (zero interval) and for one and two second lap and dissolve intervals.

The timing track processor 58 receives input signals from head 56 and produces a control signal which is provided to a control voltage ramp generator 66. This generator provides the control voltages which change the effective level of the bias oscillations as the tape travels the predetermined distance at the end of a preceeding scene and, after rewind (for simultaneous lap and dissolve), at the beginning of the succeeding scene. The timing track processor 56 also contains circuits which inhibit the drivers 44 of the video source during the pre-roll interval and before the tape reaches the start of the predetermined distance (point a of the distance a to b as was explained in connection with FIGS. 1 through 3 above). Recording of the video signals and of the timing track begin when the next scene is recorded (viz., when point a on the tape is reached).

The timing track processor contains counters which are preset, in response to the setting of the select switch 64, so as to obtain different lap and dissolve intervals. These counters and other conventional circuit elements are used to implement the timing track processor circuitry in accordance with conventional design techniques. The apparatus shown in FIG. 4 operates the same way as the apparatus described in connection with FIGS. 1 through 3. In addition to simultaneous lap and dissolve, other fade out and fade in effects can be obtained by appropriately programming the processor 56.

From the foregoing description, it will be apparent that there has been provided an improved video camera having means for recording signals with lap and dissolve between successive scenes. Variations and modifications of the herein described apparatus, within the scope of the invention, will undoubtedly suggest themselves to those skilled in the arts. Accordingly, the foregoing description should be taken as illustrative and not in a limiting sense.

I claim:
1. A video camera comprising:
 (a) reversible drive means for advancing a magnetic record member in either first or second directions along a predetermined path;
 (b) record means for magnetically recording successive multi-picture scenes on a moving record member as such member advances past a recording position in a first direction, said record means comprising magnetic head means, means for producing video signals representing scene information, a source of AC bias, means for combining said video signals and said AC bias and for applying the combined signal to said magnetic head means; and
 (c) means for producing a lap and dissolve effect between successive scenes as recorded, said lap and dissolve producing means comprising:
  (1) means operatively coupled to said source of AC bias for gradually reducing the level of AC bias applied to said magnetic head means while recording the end portion of a first scene, thereby gradually reducing the sensible level of the recorded pictures comprising said end portion while the recording member advances a predetermined distance in said first direction past said recording position;
  (2) control circuit means operatively coupled to said drive means for advancing the recording member said predetermined distance in said second direction to position the magnetic record member so that said end portion is located at a position upstream of said recording position; and
  (3) means operatively coupled to said source of AC bias for gradually increasing the level of AC bias applied to said magnetic head means while said record member is again advanced in said first direction from its upstream position to record the beginning portion of a second scene, thereby gradually increasing the sensible level of the recorded pictures of the second scene while the sensible level of the recorded pictures of the first scene is gradually reduced.

2. The apparatus as defined in claim 1, wherein said lap and dissolve effect producing means further comprising second magnetic head means for recording timing signals on said record member as said video signals are being recorded thereon, and wherein said control circuit means is responsive to said timing signals to advance the recording member said predetermined distance in said second direction.

3. The apparatus as defined in claim 1, wherein said control circuit means comprises means for generating a first control signal which decreases in amplitude between a first level and a second level while said record member advances said predetermined distance in said first direction, and for generating a second control signal which increases in amplitude from said second level to said first level while said record member again advances in said first direction from its upstream position, and wherein said bias reducing and increasing means includes level control means connected to said AC bias source and responsive to said first and second control voltages, respectively, for changing the level of said bias such that said recorded video signals are not sensible when said control signals are at said second level and are fully sensible when said control signals are at said first level.

4. Apparatus for recording a scene with the sensible level of the pictures thereof gradually changing to obtain lap or dissolve effects at least at one end of said scene, said apparatus for use in a video camera which produces video signals and bias oscillations and records said signals with said bias oscillations on a moving magnetic record member, said apparatus comprising (1) means responsive to the movement of said record member for producing a control signal while said record member moves a predetermined distance at said end of each said scene, and (2) means responsive to said control signal for gradually varying the level of said bias oscillations so as to increase the level thereof when said one end is the start of the scene and to decrease the level thereof when said one end is the finish of the scene.

5. The apparatus as defined in claim 4 wherein said control signal producing means comprises operating means for said camera conditionable from an off to an on state to enable each said scene to be recorded, means for detecting the distance over which said tape moves during recording, and means responsive to said operating means and said detecting means for providing said control signal.

6. The apparatus as defined in claim 5 wherein said detecting means comprises a track on said record member containing spaced markers thereon, and means responsive to said markers for providing timing signals.

7. The apparatus as defined in claim 6 wherein said control signal providing means includes means responsive to said timing signals for controlling the rate at which the level of said bias oscillations changes.

8. The apparatus as defined in claim 6 wherein said control means further comprises means responsive to said timing signals for controlling the movement of said record member to provide for the travel thereof over said predetermined distance while said bias oscillation level and the sensible level of said pictures change.

9. The apparatus as defined in claim 8 wherein said operating means includes an on-off switch.

10. The apparatus as defined in claim 5 wherein said detecting means comprises a magnetic head operative when the video signals are being recorded for recording timing signals on said record member, means responsive to said recorded timing signals when said operating means changes state for providing said control signal.

11. The apparatus as defined in claim 4 wherein said control signal-producing means comprises means for generating as said control signal a signal which decreases gradually in amplitude from a first level to a second level while said record member travels said predetermined distance when said one end is the start of the scene, and a signal which increases gradually in amplitude from said second level to said first level while said record member travels said predetermined distance when said one end is at the finish of the scene, said first and second levels being such that the bias oscillation level causes the recorded pictures not to be sensible when said control signal is at said second level and fully sensible when said control signal is at said first level.

12. The apparatus as defined in claim 4 wherein said one end of said scenes is the beginning thereof.

13. The apparatus as defined in claim 4 wherein said one end of said scenes is the finish thereof.

14. The apparatus as defined in claim 4 wherein said apparatus is operative to obtain lap and dissolve effects at both the beginning and finish ends of said scenes, said means for producing said control signal being operative to produce control signals which gradually increase the level of said bias oscillations while said member moves said predetermined distance at the beginning of the scene, and which gradually decrease the level of said bias oscillations while said member moves said predetermined distance at the finish of the scene.

* * * * *